US006874762B2

(12) United States Patent
Leitner

(10) Patent No.: US 6,874,762 B2
(45) Date of Patent: Apr. 5, 2005

(54) SNOWMOBILE STAND MECHANISM

(76) Inventor: Kenneth Leitner, P.O. Box 2375, Atikokan, Ontario (CA), P0T 1C0

( * ) Notice: Subject to any disclaimer, the term of this patent is extended or adjusted under 35 U.S.C. 154(b) by 0 days.

(21) Appl. No.: 10/368,052

(22) Filed: Feb. 19, 2003

(65) Prior Publication Data
US 2003/0173554 A1 Sep. 18, 2003

Related U.S. Application Data

(63) Continuation-in-part of application No. 10/098,444, filed on Mar. 18, 2002, now Pat. No. 6,688,581.

(51) Int. Cl.[7] .................................................. B66F 3/00
(52) U.S. Cl. ....................................................... 254/131
(58) Field of Search ................................ 254/131, 113, 254/114, 94, 422, 423, 124, 122

(56) References Cited

U.S. PATENT DOCUMENTS

| 2,046,918 A | * | 7/1936 | Kruse ......................... 254/423 |
| 3,570,616 A | | 3/1971 | Tominaga |
| 3,785,541 A | | 1/1974 | Sibley |
| 3,964,729 A | | 6/1976 | Harlow |
| 3,981,372 A | | 9/1976 | Moreau |
| 4,643,396 A | | 2/1987 | Beals |
| 5,135,200 A | | 8/1992 | Neibrandt |
| 5,143,352 A | | 9/1992 | Latimer |
| 5,618,030 A | | 4/1997 | Eggert |
| 5,806,836 A | | 9/1998 | Wilson |
| 5,806,837 A | | 9/1998 | Cargill et al. |
| 5,873,552 A | | 2/1999 | Skarp |
| 6,302,378 B1 | | 10/2001 | Koch et al. |

FOREIGN PATENT DOCUMENTS

| CA | 2060646 | 8/1993 |
| CA | 2123868 | 11/1995 |
| CA | 2203493 | 10/1998 |

* cited by examiner

Primary Examiner—Robert C. Watson
(74) Attorney, Agent, or Firm—Gowling Lafleur Henderson LLP

(57) ABSTRACT

A snowmobile stand mechanism for drive-track type snowmobiles is provided comprising a stand rotatable between a transport position where the stand is not engaged and a use position where the stand is engaged and elevates the drive track above the ground surface, the stand comprising leverage means that require minimal physical exertion or, alternatively, motor-driven operation. The stand is attached to the snowmobile by means of a stand track, whereby the stand can be retracted during transport and extended for use.

18 Claims, 5 Drawing Sheets

SNOWMOBILE STAND MECHANISM

CROSS REFERENCE TO RELATED APPLICATIONS

This is a continuation-in-part of U.S. application Ser. No. 10/098,444, filed Mar. 18, 2002 now U.S. Pat. No. 6,688,581.

FIELD OF THE INVENTION

The present invention relates to snowmobile stand mechanisms, and more particularly to a stand apparatus for attachment to a snowmobile that allows for lifting of the drive track of the snowmobile above ground level.

BACKGROUND OF THE INVENTION

A common problem encountered by operators of drive-track type snowmobiles is the freezing of the drive track to the slide rails which can occur due to parking the vehicle for a period of time after usage. Snow and ice that have attached to the snowmobile during the riding period may melt due to temperature conditions, and refreezing of the melted snow and ice can occur given appropriate conditions, resulting in the drive track becoming frozen to the slide rails. Another problem facing snowmobile operators is the recommendation of manufacturers that their vehicles be raised above the ground surface to warm up the drive train prior to initial attempts to move the vehicle; this relates to the need to prevent drive belt wear and disintegration.

Both of these problems facing snowmobile operators can be addressed by employing means of raising the drive track above the ground surface for a desired period. However, potential solutions to these problems are complicated by the weight of commercially available snowmobiles, which can be as much as 700 pounds. Lifting a vehicle of such considerable size is a difficult task. It is also extremely dangerous, as the vehicle must be held up with one hand while a support is positioned beneath the vehicle with the other hand.

It is not uncommon to see snowmobiles propped up on wood crates or the like as supports that are perceived as adequate for elevating the vehicle drive track. However, there are serious safety concerns with such a practice, as the operator must engage in strenuous and potentially harmful manual lifting of the vehicle rear to rest it upon the crate, and the crate is likely not a thoroughly stable support apparatus in any event. Lack of a stable support could result in the vehicle falling from the elevated position, potentially causing damage to the vehicle and its surroundings and injury to bystanders. In addition, using such a method when warming up the vehicle prior to operation could result in further potential damage from the vehicle surging forward upon support collapse.

DESCRIPTION OF THE PRIOR ART

Prior attempts to address these problems include a variety of devices such as stands and jacks. U.S. Pat. No. 3,964,729 to Harlow discloses a tripod stand for snowmobiles. The device employs a lever which, when pushed in a downward direction, serves to effect an upward pull on a strap which is temporarily secured to the rear end of the vehicle, elevating the vehicle. However, the device still requires significant physical exertion. In addition, the device is separate from the snowmobile, and this would require storage means on the vehicle not described in the patent, and the separate existence and cumbersome design of the device means that it may not always be available when needed. Such stands are, in fact, often left behind by the operator at the embarkation point, and fail to be of any further use until completion of a full return trip.

U.S. Pat. No. 4,643,396 to Beals also discloses a snowmobile tripod stand, but in this case using a hook member to engage a lift rod located at the rear of the vehicle. Again, the design is cumbersome and it is separate from the vehicle, similar problems to those found in Harlow.

Similar devices are provided in U.S. Pat. No. 5,135,200 to Neibrandt, U.S. Pat. No. 5,143,352 to Latimer, U.S. Pat. No. 5,806,836 to Wilson, U.S. Pat. No. 5,806,837 to Cargill et al., and U.S. Pat. No. 6,302,378 to Koch et al., all revealing similar difficulties and limitations.

The devices disclosed in U.S. Pat. No. 5,618,030 to Eggert and U.S. Pat. No. 5,873,552 to Skarp are designed to be collapsible, countering a limitation of the other prior art. However, Eggert is a simple lever mechanism requiring significant physical exertion and Skarp provides a stand but no means for actually lifting the vehicle to the desired elevation. As with the above-mentioned art, these two devices are separate from the vehicle and may not be available when needed due to susceptibility to loss or lack of storage space on the vehicle.

There are a handful of devices that are capable of attachment to the snowmobile itself. U.S. Pat. No. 3,981,372 to Moreau provides a motorized vehicle stand which, when employed, swings downward about a pivot point until contact with the ground surface. This fails to address the safety concerns outlined above, however, as the operator must still manually lift the rear end of the snowmobile in order to allow the stand to fully engage beneath the vehicle. U.S. Pat. No. 3,785,541 to Sibley discloses a similar stand, and it too fails to provide a means for relieving the operator from the physical stress of lifting the vehicle prior to stand engagement. Canadian patent application 2,123,868 to Ippersiel discloses another similar device, requiring simultaneous rocking and lifting of the vehicle, again failing to address fully the needs of snowmobile operators for a portable, removably attached snowmobile stand that requires only a minimal amount of physical exertion for operation.

What is therefore required is a means for safely elevating a snowmobile into a stable position, preventing refreezing of the drive track to the slide rails and allowing for elevated drive train warm-up. Also required is a snowmobile stand mechanism that can be attached to a snowmobile, said mechanism requiring limited physical exertion for operation, said mechanism also being capable of compact storage on the snowmobile.

SUMMARY OF THE INVENTION

According to one aspect of the present invention there is provided a snowmobile stand mechanism comprising a stand for a snowmobile of the type having a drive track at a back end of the snowmobile for driving the snowmobile over a ground surface, the stand having a transport position spaced above the ground surface and a use position supporting the back end of the snowmobile with the drive track spaced above the ground surface, the stand comprising:
   a support leg having a ground-engaging base;
   a lever arm assembly including:
      a lever arm;
      a lever arm mount for mounting the lever arm on the snowmobile, the lever arm mount comprising:
         a stand track mountable on the snowmobile to extend therealong;

a stand track follower engaged with the stand track and mounting the lever arm on the stand track for sliding movement longitudinally of the snowmobile between forward and rearward positions; and a lever arm pivot mounting the lever arm on the stand track follower for pivotal movement between the transport and use positions; and a fulcrum pivot mounting the support leg on the lever arm for movement of the support leg between the transport and use positions in response to movement of the lever arm between the transport and use positions;

the parts being arranged such that in the use position, the lever arm is in the rearward position, the support leg is substantially in the upright with its base engaged with the ground surface, and the lever arm pivot is above the fulcrum pivot, and in the transport position, the lever arm is in the forward position and the lever arm and support leg both extend along the snowmobile, above the ground surface.

According to another aspect of the present invention there is provided a snowmobile of the type having a drive track at a back end thereof, a stand for selectively supporting the drive track above a ground surface, the stand having a transport position spaced above the ground surface and a use position supporting the back end of the snowmobile with the drive track spaced above the ground surface, the stand comprising:

a support leg having a ground-engaging base;
a lever arm assembly including:
  a lever arm;
  a lever arm mount mounting the lever arm on the snowmobile, the lever arm mount comprising:
    a stand track mounted on the snowmobile to extend therealong;
    a stand track follower engaged with the stand track and mounting the lever arm on the stand track for sliding movement longitudinally of the snowmobile between forward and rearward positions; and
    a lever arm pivot mounting the lever arm on the stand track follower for pivotal movement between the transport and use positions; and
  a fulcrum pivot mounting the support leg on the lever arm for movement of the support leg between the transport and use positions in response to movement of the lever arm between the transport and use positions;

the parts being arranged such that in the use position, the lever arm is in the rearward position, the support leg is substantially in the upright with its base engaged with the ground surface, and the lever arm pivot is above the fulcrum pivot, and in the transport position, the lever arm is in the forward position and the lever arm and support leg both extend along the snowmobile, above the ground surface.

In preferred embodiments of the present invention, the support leg is substantially U-shaped, with two substantially parallel members extending from the base to the fulcrum pivot. A support leg latch may be included to be selectively engageable for connecting the support leg and the lever arm to prevent pivotal movement of the support leg about the fulcrum pivot. A lever assembly catch mechanism may also be adapted to be mounted on the snowmobile for selectively fastening the lever arm in the transport position to prevent rotation of the lever arm about the lever arm mount. The stand track preferably comprises a lever arm latch for selectively fastening the lever arm assembly in the use position.

To assist in the goal of providing for minimal physical exertion during operation of the snowmobile lift mechanism, the present invention may be adapted to employ a motor-driven stand actuator. In this preferred embodiment, an actuator motor is attached to the snowmobile by a motor mount, the motor output being connected to the lever arm for selectively moving the lever arm between the transport and use positions.

A detailed description of preferred embodiments of the present invention is given in the following. It is to be understood, however, that the invention is not to be construed as limited to those embodiments.

BRIEF DESCRIPTION OF THE DRAWINGS

In the accompanying drawings, which illustrate exemplary embodiments of the present invention.

DETAILED DESCRIPTION OF THE PREFERRED EMBODIMENTS

Figure 1:
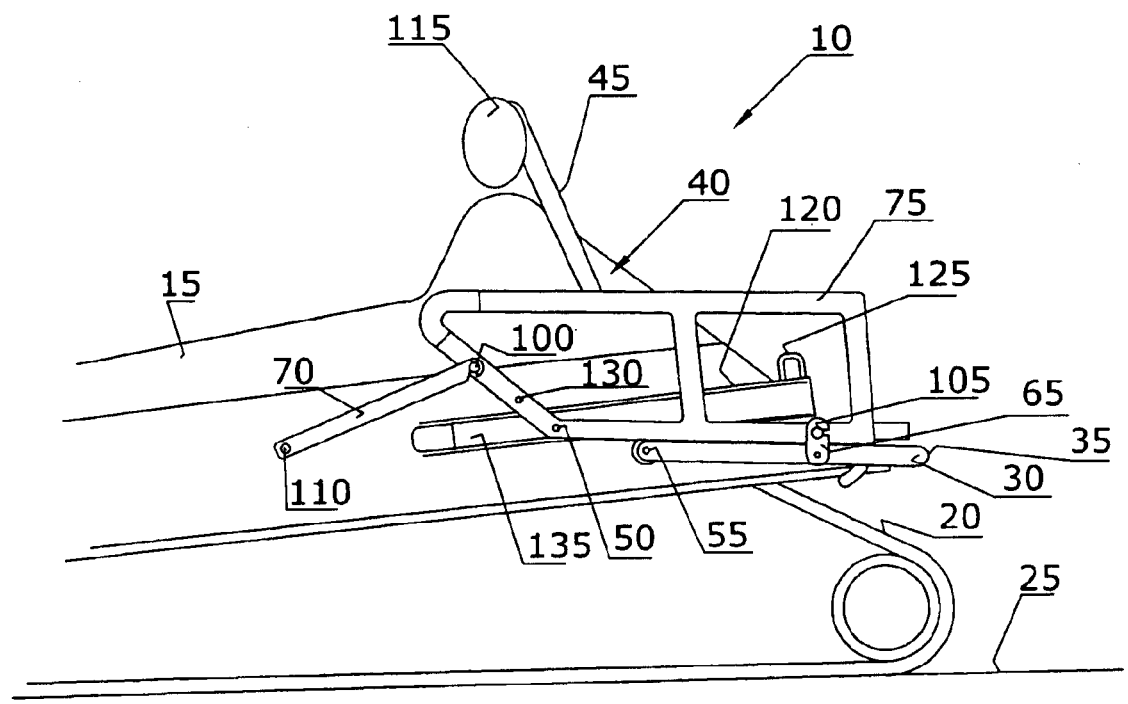
FIG. 1 is a side view of a manual embodiment of the present invention as installed on a snowmobile, in the transport position.
Figure 2:
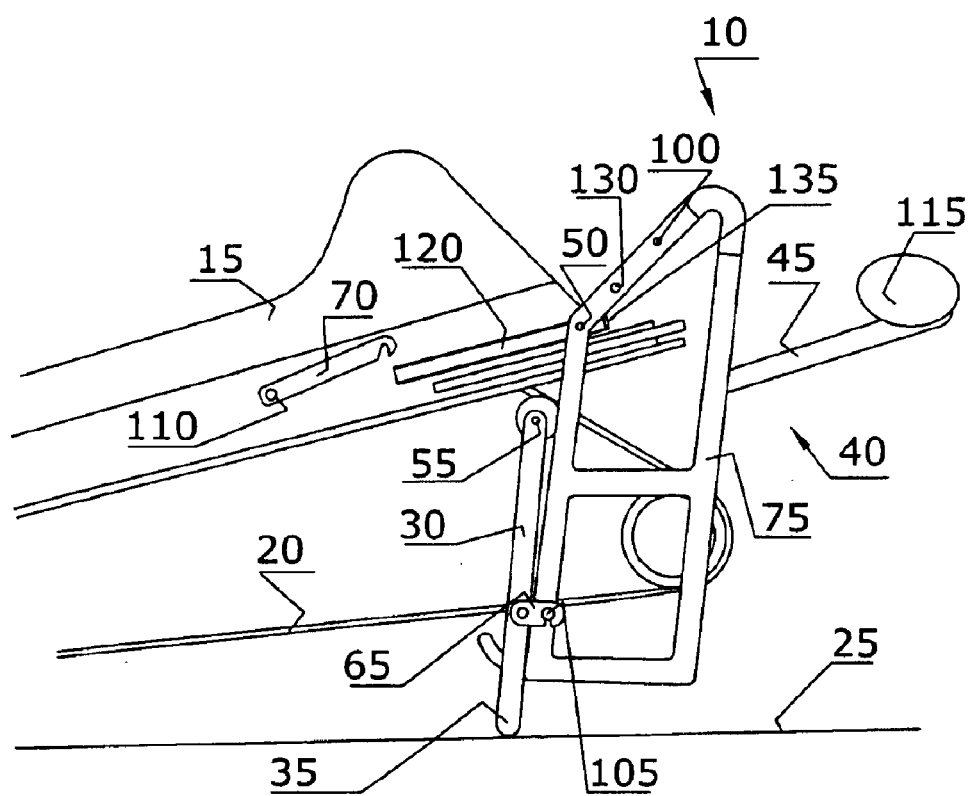
FIG. 2 is a side view of a manual embodiment of the present invention as installed on a snowmobile, in the use position.
Figure 5:
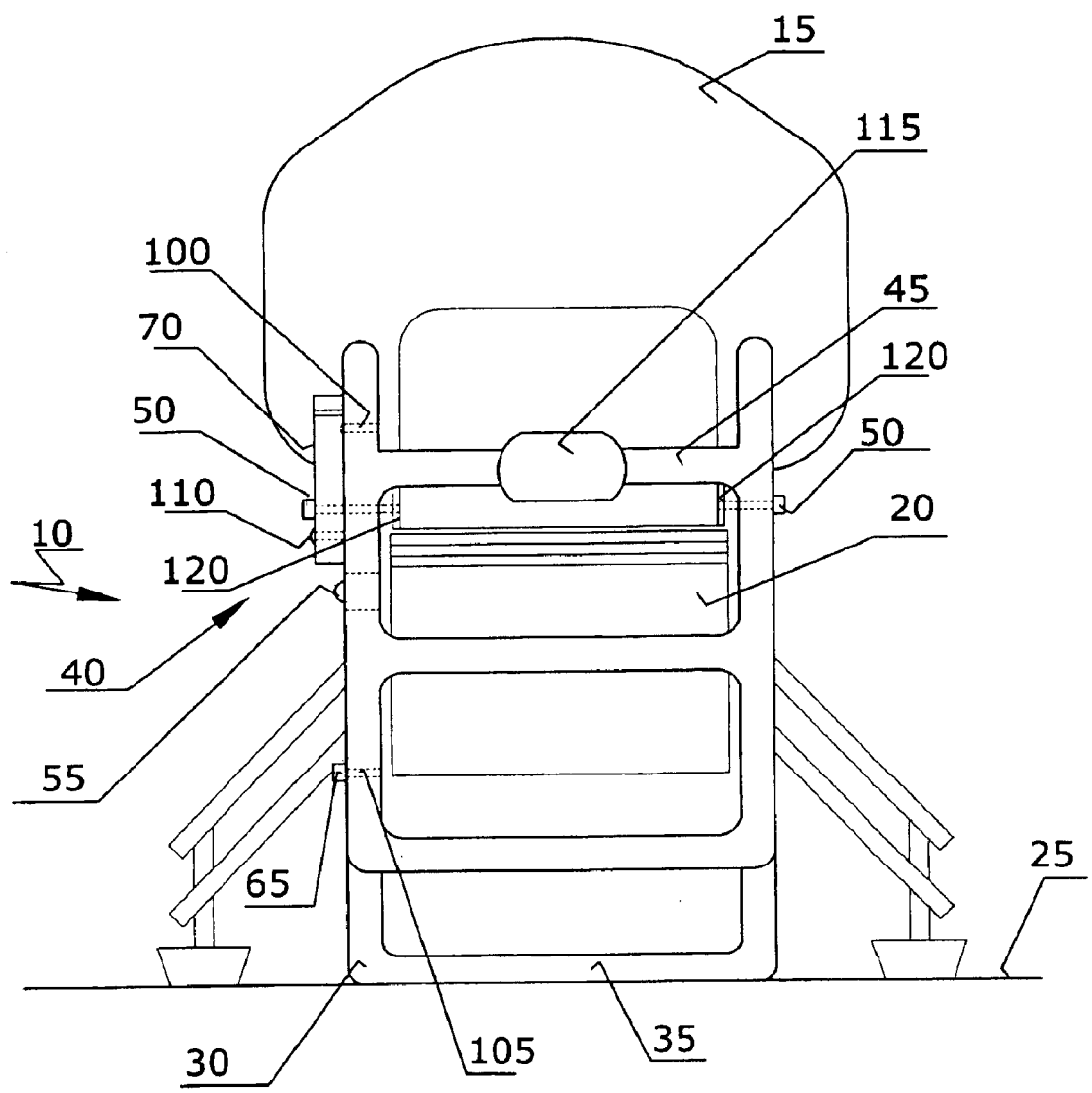
FIG. 5 is a rear view of a manual embodiment of the present invention as installed on a snowmobile, in the use position.

Referring now in detail to the accompanying drawings, there are illustrated preferred embodiments of a snowmobile stand mechanism generally referred to by the numeral 10, shown removably attached to a snowmobile 15, said snowmobile 15 of a common type familiar to those skilled in the art and requiring no further description. The snowmobile 15 is driven by a drive track 20. As can be seen in FIGS. 1 and 2, the snowmobile stand mechanism 10 comprises a support leg 30 having a ground-engaging base 35, and a lever arm assembly 40. The lever arm assembly 40 comprises a lever arm 45, a lever arm mount, and a fulcrum pivot 55 mounting the support leg 30 on the lever arm 45 for movement of the support leg 30 between the transport and use positions in response to movement of the lever arm 45 between the transport and use positions. The lever arm mount comprises a stand track 120 mounted on the snowmobile 15 to extend therealong, a stand track follower 135 engaged with the stand track 120 and mounting the lever arm 45 on the stand track 120 for sliding movement longitudinally of the snowmobile 15 between forward and rearward positions, and a lever arm pivot 50 mounting the lever arm 45 on the stand track follower 135 for pivotal movement between the transport and use positions. The stand track 120 is employed to allow for retraction of the lever arm assembly 40 during transport and extension of same for use. When in the use position, the lever arm assembly 40 can be selectively fastened to the track by means of the lever arm latch 125, which receives a pin 130. As can be seen in FIG. 5, the support leg 30 is preferably U-shaped with two substantially parallel members extending from the ground-engaging base 35 to the fulcrum pivot 55.

The support leg 30 is fitted with a support leg latch 65 which acts to prevent rotation of the support leg 30 about the fulcrum pivot 55. The support leg latch 65 is selectively engageable and attaches to engagement means 105. The lever arm 45 may be selectively fastened in the transport position by means of a lever assembly catch mechanism 70 which rotates about the pivot defined by pivot means 110 and attaches to engagement means 100.

Figure 3:
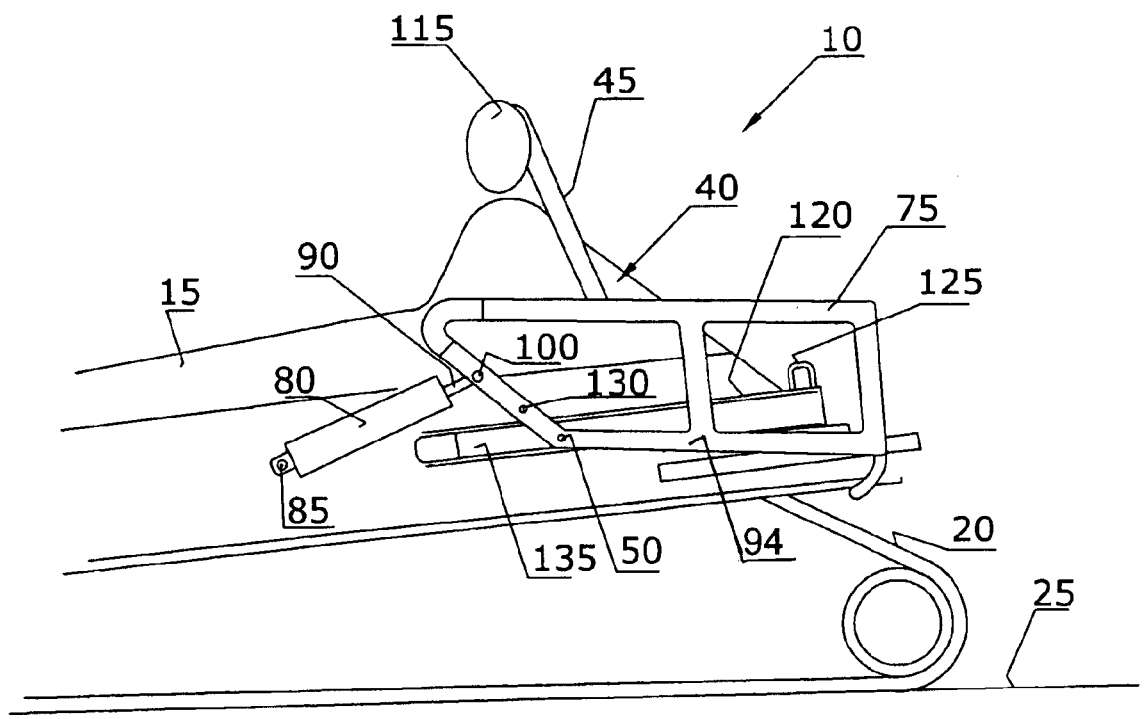
FIG. 3 is a side view of a powered embodiment of the present invention as installed on a snowmobile, in the transport position.
Figure 4:
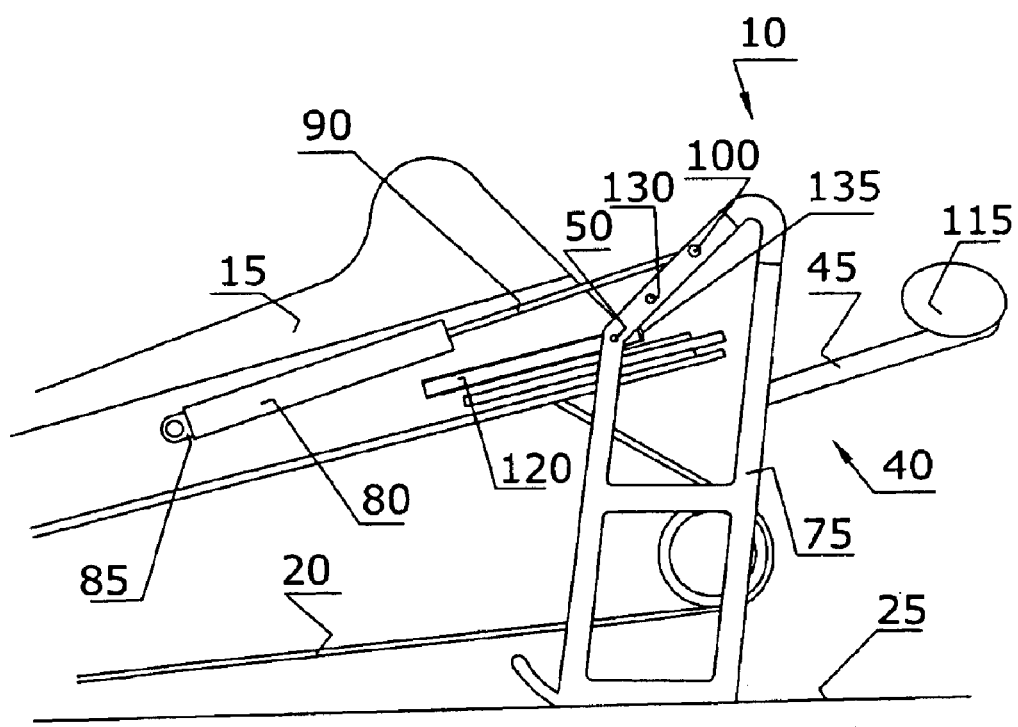
FIG. 4 is a side view of a powered embodiment of the present invention as installed on a snowmobile, in the use position.

In the motor-driven embodiment illustrated in FIGS. 3 and 4, there is no separate support leg 30 but a support leg 94 of the lever arm assembly 40 is instead fitted with a ground-engaging base 95 which engages the ground surface 25 when in the use position. Nor is there a need for an independent lever assembly catch mechanism 70; this function is performed by the actuator motor 80 and motor output 90 which force rotation of the lever arm assembly 40 about the lever arm mount 50. The actuator motor 80 is fitted with a motor mount 85 which is attached to the snowmobile 15 by suitable means familiar to those skilled in the art.

Having fitted a snowmobile 15 with the snowmobile stand mechanism 10 described above, the utility of the present invention becomes clear in the following situation. Having either operated the snowmobile 15 and being desirous of parking it for a period of time, or being desirous of starting the snowmobile 15 with an elevated position to allow proper warm-up, the snowmobile stand mechanism 10 is operated as follows. For the preferred manual embodiment as illustrated in FIGS. 1 and 2, and beginning with the snowmobile stand mechanism 10 in the transport position as in FIG. 1, the snowmobile operator (not shown) would first release the lever assembly catch mechanism 70 which was held by the engagement means 100 and rotate the end of the lever assembly catch mechanism 70 that was held by the engagement means 100 upwards about the pivot point defined by the pivot means 110 (see FIG. 2 for the released position), extend the lever arm assembly 40 along the stand track 120 (latching it if desired by means of the lever arm latch 125 and the pin 130), then release the support leg latch 65 which was held by the engagement means 105, allowing the support leg 30 to rotate in a downward direction about the pivot point defined by the fulcrum pivot 55, the support leg 30 rotating to an upright, near-vertical orientation with the ground-engaging base 35 engaging the ground. By releasing the lever assembly catch mechanism 70, the lever arm assembly 40 is allowed to rotate about the lever arm pivot 50. The rotation of the lever arm assembly 40, facilitated by minimal application of manual force to the lever arm 45 by the snowmobile operator, drives the fulcrum pivot 55 in a generally downward direction, forcing the ground-engaging base 35 into firm contact with the ground surface 25. Continued rotation of the lever arm assembly 40 by a further minimal application of manual force to the lever arm 45 by the snowmobile operator will cause the lever arm pivot 50 to pass over the fulcrum pivot 55, resulting in a shift of vehicle balance that uses the weight of the snowmobile 15 to bring the lever arm assembly 40 and the support leg 30 into contact along their lengths as can be seen in FIG. 2, and support leg latch 65 can be engaged using engagement means 105 to bring stability to the elevated position. The drive track 20 is now no longer in contact with the ground surface 25, allowing for desired vehicle warm-up operation. The snowmobile 15 can easily be returned to its original transport position by reversing the above steps.

For the preferred motor-driven (electric, hydraulic, or pneumatic) embodiment as illustrated in FIGS. 3 and 4, and beginning with the snowmobile stand mechanism 10 in the transport position as in FIG. 3, the snowmobile operator (not shown) would not need to release any locking structures, as the rotation of the lever arm assembly 40 is controlled by the actuator motor 80. Activating the actuator motor 80 by conventional means well known to those skilled in the art, the motor output 90 is driven into the lever arm assembly 40 at engagement means 100. As the actuator motor 80 drives the motor output 90, the actuator motor 80 rotates about a pivot point defined by the motor mount 85, forcing movement of the lever arm pivot 50 along the stand track 120 and rotation of the lever arm assembly 40 about the lever arm pivot 50. This rotation of the lever arm assembly 40 will result in the ground-engaging base 95 contacting the ground surface 25 and the vehicle coming to rest in a relatively stable use position as is illustrated in FIG. 4, movement of the ground-engaging base 95 beneath the rear of the snowmobile 15 being facilitated by the curved lip of the ground-engaging base 95. If desired, the lever arm latch 125 and the pin 130 may be employed to provide a stronger locking of the lever arm assembly 40 in position. The drive track 20 is now no longer in contact with the ground surface 25, allowing for desired vehicle warm-up operation. Again, the snowmobile 15 can easily be returned to its original transport position by reversing the above steps.

One further need of snowmobile operators is to have a luggage carrier of some sort provided at the vehicle rear. While some devices incorporate a luggage carrier, such as can be seen in Sibley, the lack of a solution adequately addressing the other problems mentioned above points to the need for a new apparatus that can meet all needs. In accordance with the need for providing a luggage carrier on snowmobiles, the present invention may be adapted such that a luggage carrier is mounted on the lever arm 45. In the preferred embodiments illustrated in FIGS. 1 to 4, a luggage carrier 75 is defined in side view as incorporated as part of the lever arm assembly 40. It is also to be noted, as can best be seen in FIGS. 1 and 3, that the lever arm 45 can be fitted with a back rest 115 at the end remote from the bulk of the lever arm assembly 40, for increased operator and passenger safety and comfort.

While two particular embodiments of the present invention have been described in the foregoing, it is to be understood that other embodiments are possible within the scope of the invention and are intended to be included herein. It will be clear to any person skilled in the art that modifications of and adjustments to this invention, not shown, are possible without departing from the spirit of the invention as demonstrated through the preferred embodiments. The snowmobile stand mechanism could also, for example, be designed to allow for easier cleaning, servicing, and repair of snowmobiles, yet another substantial and novel benefit of the present invention. The invention is therefore to be considered limited solely by the scope of the appended claims.

Embodiments of the invention in which an exclusive property or privilege is claimed are defined as follows:

1. A stand for a snowmobile of the type having a drive track at a back end of the snowmobile for driving the snowmobile over a ground surface, the stand having a transport position spaced above the ground surface and a use position supporting the back end of the snowmobile with the drive track spaced above the ground surface, the stand comprising:

a support leg having a ground-engaging base;

a lever arm assembly for mounting the support leg on the snowmobile for movement between the transport and use positions, the lever arm assembly including:

a lever arm;

a lever arm mount for mounting the lever arm on the snowmobile, the lever arm mount comprising:
  a stand track mountable on the snowmobile to extend therealong;
  a stand track follower engaged with the stand track and mounting the lever arm on the stand track for sliding movement longitudinally of the snowmobile between forward and rearward positions; and
  a lever arm pivot mounting the lever arm on the stand track follower for pivotal movement between the transport and use positions;
a support leg mount mounting the support leg on the lever arm such that the support leg moves between the transport and use positions in response to movement of the lever arm between the transport and use positions;
the parts being arranged such that in the use position, the stand track follower is in the rearward position, the support leg is substantially upright with its base engaged with the ground surface, and, in the transport position, the stand track follower is in the forward position and the lever arm and support leg extend along the snowmobile, above the ground surface.

2. A stand according to claim 1 including a fulcrum pivot mounting the support leg on the lever arm for movement of the support leg between the transport and use positions in response to movement of the lever arm between the transport an use positions.

3. A stand according to claim 2 wherein the support leg is substantially U-shaped, with two substantially parallel members extending from the base to the fulcrum pivot.

4. A stand according to claim 2 including a support leg latch selectively engageable for connecting the support leg and the lever arm to prevent pivotal movement of the support leg about the fulcrum pivot.

5. A stand according to claim 1 including a lever assembly catch mechanism adapted to be mounted on the snowmobile for selectively fastening the lever arm in the transport position to prevent rotation of the lever arm about the lever arm pivot.

6. A stand according to claim 1 including a luggage carrier mounted on the lever arm.

7. A stand according to claim 1 wherein the lever assembly includes an actuator motor, a motor mount for attaching the motor to the snowmobile and motor output connected to the lever arm at a position spaced from the lever arm mount for selectively moving the lever arm between the transport and use positions.

8. A stand according to claim 2 wherein, in the use position, the lever arm is in the rearward position, the support leg is substantially upright with its base engaged with the ground surface, and the lever arm pivot is above the fulcrum pivot, and in the transport position, the lever arm is in the forward position and the lever arm and support leg both extend along the snowmobile, above the ground surface.

9. A stand according to claim 8 wherein in the use position, the support leg and the lever arm constitute an over center linkage, with a line from the base to the lever arm pivot passing to a back side of the fulcrum pivot.

10. In a snowmobile of the type having a drive track at a back end thereof, a stand for selectively supporting the drive track above a ground surface, the stand having a transport position spaced above the ground surface and a use position supporting the back end of the snowmobile with the drive track spaced above the ground surface, the stand comprising:
  a support leg having a ground-engaging base;
  a fever arm assembly including:
    a lever arm;
    a lever arm mount mounting the lever arm on the snowmobile, the lever arm mount comprising:
      a stand track mounted on the snowmobile to extend therealong;
      a stand track follower engaged with the stand track and mounting the lever arm on the stand track for sliding movement longitudinally of the snowmobile between forward and rearward positions; and
      a lever arm pivot mounting the lever arm on the stand track follower for pivotal movement between the transport and use positions; and
    a fulcrum pivot mounting the support leg on the lever arm for movement of the support leg between the transport and use positions in response to movement of the lever arm between the transport and use positions;
  the parts being arranged such that in the use position, the lever arm is in the rearward position, the support leg is substantially in the upright with its base engaged with the ground surface, and the lever arm pivot is above the fulcrum pivot, and in the transport position, the lever arm is in the forward position and the lever arm and support leg both extend along the snowmobile, above the ground surface.

11. The invention according to claim 10 wherein the support leg is substantially u-shaped, with two substantially parallel members extending from the base to the fulcrum pivot.

12. The invention according to claim 10 including a support leg latch selectively engageable for connecting the support leg and the lever arm to prevent pivotal movement of the support leg about the fulcrum pivot.

13. The invention according to claim 10 including a lever assembly catch mechanism adapted to be mounted on the snowmobile for selectively fastening the lever arm in the transport position to prevent rotation of the lever arm about the lever arm mount.

14. The invention according to claim 10 including a luggage carrier mounted on the lever arm.

15. The invention according to claim 10 wherein the lever assembly includes an actuator motor, a motor mount for attaching the motor to the snowmobile and motor output connected to the lever arm at a position spaced from the lever arm mount for selectively moving the lever arm between the transport and use positions.

16. The invention according to claim 10 wherein in the use position, the support leg and the lever arm constitute an over center linkage, with a line from the base to the lever arm mount passing to a back side of the fulcrum pivot.

17. A stand according to claim 1 wherein the stand track comprises a lever arm latch for selectively fastening the lever arm assembly in the use position.

18. The invention according to claim 10 wherein the stand track comprises a lever arm latch for selectively fastening the lever arm assembly in the use position.

* * * * *